United States Patent
Lin et al.

(10) Patent No.: US 12,184,550 B2
(45) Date of Patent: Dec. 31, 2024

(54) FLOW RATE CONTROL METHOD AND APPARATUS

(71) Applicant: HUAWEI TECHNOLOGIES CO., LTD., Guangdong (CN)

(72) Inventors: Yanzhu Lin, Shenzhen (CN); Heyang Liu, Nanjing (CN); Hewen Zheng, Nanjing (CN); Lei Han, Nanjing (CN); Jinfeng Yan, Nanjing (CN); Peiying Tao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 367 days.

(21) Appl. No.: 17/573,909

(22) Filed: Jan. 12, 2022

(65) Prior Publication Data
US 2022/0141137 A1 May 5, 2022

Related U.S. Application Data

(63) Continuation of application No. PCT/CN2020/102158, filed on Jul. 15, 2020.

(30) Foreign Application Priority Data

Jul. 18, 2019 (CN) .......................... 201910649933.6

(51) Int. Cl.
*H04L 47/11* (2022.01)
*H04L 47/125* (2022.01)

(52) U.S. Cl.
CPC ............ *H04L 47/11* (2013.01); *H04L 47/125* (2013.01)

(58) Field of Classification Search
CPC .............................. H04L 47/11; H04L 47/125
See application file for complete search history.

(56) References Cited

U.S. PATENT DOCUMENTS

| | | |
|---|---|---|
| 2008/0298248 A1 | 12/2008 | Roeck et al. |
| 2016/0226772 A1 | 8/2016 | Srinivasan et al. |
| 2017/0093699 A1 | 3/2017 | Crupnicoff et al. |
| 2019/0116126 A1* | 4/2019 | Shen ................. H04L 47/11 |
| 2019/0342199 A1* | 11/2019 | Hurson ............. H04L 43/0882 |

FOREIGN PATENT DOCUMENTS

| | | | |
|---|---|---|---|
| CN | 104753810 A | 7/2015 | |
| CN | 107493238 A | * 12/2017 | ............. H04L 45/72 |
| CN | 108418767 A | 8/2018 | |

(Continued)

OTHER PUBLICATIONS

Yixiao Gao et al, DCQCN+: Taming Large-scale Incast Congestion in RDMA over Ethernet Network, 2018 IEEE 26th International Conference on Network Protocols, total 11 pages.

*Primary Examiner* — Siming Liu (57) ABSTRACT

This application provides a flow rate control method and apparatus. The flow rate control method in this application includes: receiving N explicit congestion notification packets CNPs from a first device, where the N CNPs correspond to a first data flow, and N is a natural number; and sending M CNPs to a second device based on the N CNPs, where the M CNPs correspond to the first data flow, and M is an integer greater than N. This application resolves a problem that rate increase processing is still performed on a data flow when the data flow is congested.

17 Claims, 3 Drawing Sheets

Receive N CNPs from a first device, where the N CNPs correspond to a first data flow — 301

Send M CNPs to a second device based on the N CNPs, where the M CNPs correspond to the first data flow — 302

(56) References Cited

FOREIGN PATENT DOCUMENTS

| | | |
|---|---|---|
| CN | 108512774 A | 9/2018 |
| CN | 109391560 A | 2/2019 |
| CN | 109981471 A | 7/2019 |
| KR | 101992750 B1 | 6/2019 |
| WO | 2019031739 A1 | 2/2019 |

\* cited by examiner

FLOW RATE CONTROL METHOD AND APPARATUS

CROSS-REFERENCE TO RELATED APPLICATIONS

This application is a continuation of International Application No. PCT/CN2020/102158, filed on Jul. 15, 2020, which claims priority to Chinese Patent Application No. 201910649933.6, filed on Jul. 18, 2019. The disclosures of the aforementioned applications are hereby incorporated by reference in their entireties.

TECHNICAL FIELD

This application relates to communication technologies, and in particular, to a flow rate control method and apparatus.

BACKGROUND

A remote direct memory access (RDMA) technology allows a client-side application to directly and remotely read data from and write data into a server-side memory, to reduce latency of data processing at a server side in network transmission. In the RDMA technology, data is directly sent and received on network interface cards (NICs) of end nodes by using a registered cache, all network protocols are deployed on the NICs, and the data does not need to pass through a network protocol stack of a host. In this manner, occupancy and overall latency of a central processing unit (CPU) in the host are significantly reduced. An RDMA protocol applied to the aggregated Ethernet includes two versions: RoCEv1 and RoCEv2 (RDMA over Converged Ethernet, RoCE). A difference between the RoCEv1 and the RoCEv2 is that the RoCEv1 is an RDMA protocol implemented based on an Ethernet link layer, and the RoCEv2 is an RDMA protocol implemented based on a UDP layer in a transmission control protocol/Internet protocol (TCP/IP) in the Ethernet.

After a network protocol that meets requirements of a high throughput, ultra-low latency, and low CPU overheads is deployed, a congestion control algorithm needs to be found to ensure reliable transmission without a packet loss over a network. Therefore, data center quantized congestion notification (DCQCN) is proposed. A communication system that implements a DCQCN-based congestion control algorithm includes a reaction point (RP), a congestion point (CP), and a notification point (NP). On the CP, if a depth of an egress queue of the CP exceeds a threshold, the CP adds an explicit congestion notification (ECN) marker to a packet newly added to the egress queue. On the NP, when the packet with the ECN marker (namely, a congestion encountered (CE) packet) arrives at the NP, it indicates network congestion. Therefore, the NP sends the network congestion information to the RP. The RoCEv2 protocol defines an explicit congestion notification packet (CNP). If the CE packet arrives for a flow and the NP has not sent a CNP for the flow in past n microseconds, the NP immediately sends one CNP. In other words, if a plurality of CE packets arrive for a flow within a time window (n microseconds), the NP generates at most one CNP for the flow every n microseconds. On the RP, when the RP receives one CNP, the RP reduces a sending rate and updates a rate reduction factor. In addition, if the RP does not receive a CNP within a continuous period of time, the RP increases the sending rate according to a specific algorithm.

However, in the foregoing process, when a scale of flows is relatively large, an average bandwidth that can be allocated to each flow is relatively small. For a congested flow, a packet interval of each flow (namely, a minimum interval at which a CNP can be obtained for each flow) may be longer than a rate increase interval. Even if the NP generates a CNP based on each CE packet, the RP cannot perform rate reduction processing during the rate increase interval. As a result, rate increase processing is performed on the congested flow, rate control convergence fails, and packet transmission efficiency is affected.

SUMMARY

This application provides a flow rate control method and apparatus, to resolve a problem that rate increase processing is still performed on a data flow when the data flow is congested.

According to a first aspect, this application provides a flow rate control method. The method includes:

receiving N explicit congestion notification packets CNPs from a first device, where the N CNPs correspond to a first data flow, and N is a natural number; and sending M CNPs to a second device based on the N CNPs, where the M CNPs correspond to the first data flow, and M is an integer greater than N.

In this application, a network device receives the N CNPs from the first device, and then sends the M CNPs to the second device, where M is greater than N. It can be ensured that the second device can receive one CNP corresponding to the first data flow at an interval. Therefore, rate reduction processing is performed on a sending rate of the first data flow based on the CNP, thereby resolving a problem that rate increase processing is still performed on the first data flow when the first data flow is congested.

In an optional implementation, the CNP is used to indicate that the first data flow is congested.

In an optional implementation, the CNP includes a first destination address, a first source address, and a first destination queue pair identifier; and a packet in the first data flow includes a second destination address, a second source address, and a second destination queue pair identifier, where the first destination address is the same as the second source address, and the first source address is the same as the second destination address.

In an optional implementation, the sending M CNPs to a second device based on the N CNPs includes: sending the M CNPs based on a specified period.

In this application, it can be ensured that the second device can receive the CNP corresponding to the first data flow at the interval, to perform the rate reduction processing on the sending rate of the first data flow based on the CNP, thereby resolving the problem that the rate increase processing is still performed on the first data flow when the first data flow is congested.

In an optional implementation, the sending M CNPs to a second device based on the N CNPs includes: monitoring, within a current period, whether the CNP from the first device is received; and if the CNP from the first device is not received, creating an auxiliary CNP, and sending the auxiliary CNP to the second device.

In this application, after receiving the N CNPs from the first device, the network device directly forwards the CNPs to the second device. If no CNP from the first device is received within an entire period, the network device creates one CNP and sends the CNP to the second device. It can be ensured that the second device can receive the CNP corresponding to the first data flow at the interval, to perform the rate reduction processing on the sending rate of the first data flow based on the CNP, thereby resolving the problem that the rate increase processing is still performed on the first data flow when the first data flow is congested.

In an optional implementation, the sending M CNPs to a second device based on the N CNPs includes: from receiving the first CNP in the N CNPs, starting timing each time one CNP is received; and when timing duration exceeds a specified threshold, if a next CNP from the first device is not received, creating an auxiliary CNP, and sending the auxiliary CNP to the second device.

In this application, from receiving the first CNP in the N CNPs from the first device, the network device directly forwards the CNP to the second device. However, after receiving a CNP from the first device, if a next CNP from the first device is not received within a period of time (for example, duration exceeds the specified threshold), the network device creates one CNP and sends the CNP to the second device. In this way, a case in which after the second device receives the CNP, the next CNP corresponding to the first data flow may be received at a very long interval is avoided. It is ensured that the second device can perform the rate reduction processing on the sending rate of the first data flow in time based on the CNP, thereby resolving the problem that the rate increase processing is still performed on the first data flow when the first data flow is congested.

In an optional implementation, the method further includes: starting timing each time the auxiliary CNP is sent to the second device; and when timing duration exceeds the specified threshold, if a next CNP from the first device is not received, creating another auxiliary CNP, and sending the another auxiliary CNP to the second device.

In this application, after sending the CNP created by the network device, the network device may restart timing. When timing duration exceeds the specified threshold, and the next CNP from the first device is not received, the network device creates one CNP and sends the CNP to the second device. To be specific, the network device receives one CNP from the first device; and after a period of time (for example, the duration exceeds the specified threshold), if the network device does not receive the next CNP from the first device, the network device creates one CNP and sends the CNP to the second device. After sending the CNP, if the network device still does not receive the next CNP from the first device after the period of time (for example, the duration exceeds the specified threshold), the network device creates one CNP and sends the CNP to the second device. The rest may be deduced by analogy. In this way, the case in which after the second device receives the CNP, the next CNP corresponding to the first data flow may be received at the very long interval is avoided. It is ensured that the second device can perform the rate reduction processing on the sending rate of the first data flow in time based on the CNP, thereby resolving the problem that the rate increase processing is still performed on the first data flow when the first data flow is congested.

In an optional implementation, that the CNP from the first device is not received means that a value of a CNP passing marker in a flow table entry of the first data flow is a first value.

In this application, the network device may determine, based on a specific marker in the flow table entry, for example, the CNP passing marker, whether the CNP from the first device is received, to improve processing efficiency.

In an optional implementation, the method further includes: monitoring, within the current period, whether the CNP from the first device is received; and if the CNP from the first device is received, setting the value of the CNP passing marker in the flow table entry of the first data flow to a second value, and setting the value of the CNP passing marker to the first value when the current period ends.

In an optional implementation, before the receiving N CNPs from a first device, the method further includes: creating the flow table entry of the first data flow based on a link establishment packet, where the flow table entry of the first data flow includes the second destination address, the second source address, the second destination queue pair identifier, a source queue pair identifier of the first data flow, and the CNP passing marker.

In an optional implementation, after the creating the flow table entry of the first data flow based on a link establishment packet, the method further includes: deleting the flow table entry of the first data flow based on a link deletion packet.

In an optional implementation, before the sending M CNPs to a second device based on the N CNPs, the method further includes: when the flow table entry of the first data flow does not exist, if the CNP from the first device is received for the first time, creating the flow table entry of the first data flow and starting an entry timeout timer. The flow table entry of the first data flow includes the second destination address, the second source address, the source queue pair identifier of the first data flow, the CNP passing marker, and a timeout identifier of the flow table entry of the first data flow, where the timeout identifier is used to indicate whether the entry timeout timer expires.

In an optional implementation, after the creating the flow table entry of the first data flow and starting an entry timeout timer, the method further includes: when the timeout identifier indicates that the entry timeout timer expires, if the CNP from the first device is not received within a timing period of the entry timeout timer, deleting the flow table entry of the first data flow.

In an optional implementation, the sending M CNPs to a second device based on the N CNPs includes: after a first queue enters a congested state, sending the M CNPs to the second device based on the N CNPs, where the first queue is a queue including the first data flow in a plurality of egress sending queues.

In this application, only after the first queue enters the congested state, the network device may actively create the auxiliary CNP and send the auxiliary CNP to the second device when the CNP from the first device is not received. In this way, when the first queue does not enter the congested state, the rate reduction processing caused by an unnecessary CNP can be avoided.

In an optional implementation, before the sending M CNPs to a second device based on the N CNPs, the method further includes: determining a current status of the first queue; and when the first queue is not in the congested state and a depth of the first queue is greater than a first threshold, determining that the first queue enters the congested state; or when the first queue is in the congested state and a depth of the first queue is less than a second threshold, determining that the first queue exits the congested state, where the first threshold is greater than the second threshold.

According to a second aspect, this application provides a flow rate control method. The method includes:
receiving a first data flow from a second device, where the first data flow includes N congestion encountered CE packets, and N is a natural number; and sending M explicit congestion notification packets CNPs to the second device based on the N CE packets, where the M CNPs correspond to the first data flow, and M is an integer greater than N.

In this application, a server receives the first data flow from the second device, where the first data flow includes the N CE packets; and then sends the M CNPs to the second device, where M is greater than N. It can be ensured that the second device can receive one CNP corresponding to the first data flow at an interval, so that rate reduction processing is performed on a sending rate of the first data flow based on the CNP, thereby resolving a problem that rate increase processing is still performed on the first data flow when the first data flow is congested.

In an optional implementation, the CNP is used to indicate that the first data flow is congested.

In an optional implementation, the CNP includes a first destination address, a first source address, and a first destination queue pair identifier; and a packet in the first data flow includes a second destination address, a second source address, and a second destination queue pair identifier, where the first destination address is the same as the second source address, and the first source address is the same as the second destination address.

In an optional implementation, the sending M CNPs to the second device based on the N CE packets includes: sending the M CNPs based on a specified period.

In this application, it can be ensured that the second device can receive the CNP corresponding to the first data flow at the interval, to perform the rate reduction processing on the sending rate of the first data flow based on the CNP, thereby resolving the problem that the rate increase processing is still performed on the first data flow when the first data flow is congested.

In an optional implementation, the sending M CNPs to the second device based on the N CE packets includes: monitoring, within a current period, whether the CNP is sent; and if the CNP is not sent, creating an auxiliary CNP, and sending the auxiliary CNP to the second device.

In this application, after receiving the CE packet in the first data flow, the server may send the CNP to the second device based on the CE packet. If no CNP is sent to the second device within an entire period, the server creates one CNP and sends the CNP to the second device. It can be ensured that the second device can receive the CNP corresponding to the first data flow at the interval, to perform the rate reduction processing on the sending rate of the first data flow based on the CNP, thereby resolving the problem that the rate increase processing is still performed on the first data flow when the first data flow is congested.

In an optional implementation, that the CNP is not sent means that a value of a CNP sending marker in a flow table entry of the first data flow is a first value.

In this application, the network device may determine, based on a specific marker in the flow table entry, for example, the CNP sending marker, whether the CNP has been sent to the second device, to improve processing efficiency.

In an optional implementation, the method further includes: monitoring, within the current period, whether the CNP is sent; and if the CNP is sent, setting the value of the CNP sending marker in the flow table entry of the first data flow to a second value, and setting the value of the CNP sending marker to the first value when the current period ends.

In an optional implementation, before the receiving a first data flow from a second device, the method further includes: creating the flow table entry of the first data flow based on a link establishment packet, where the flow table entry of the first data flow includes the second destination address, the second source address, the second destination queue pair identifier, a source queue pair identifier of the first data flow, and the CNP sending marker.

In an optional implementation, after the creating the flow table entry of the first data flow based on a link establishment packet, the method further includes: deleting the flow table entry of the first data flow based on a link deletion packet.

In an optional implementation, before the sending M CNPs to the second device based on the N CE packets, the method further includes: when the flow table entry of the first data flow does not exist, if the CNP is sent for the first time, creating the flow table entry of the first data flow and starting an entry timeout timer. The flow table entry of the first data flow includes the second destination address, the second source address, the source queue pair identifier of the first data flow, the CNP sending marker, and a timeout identifier of the flow table entry of the first data flow, where the timeout identifier is used to indicate whether the entry timeout timer expires.

In an optional implementation, after the creating the flow table entry of the first data flow and starting an entry timeout timer, the method further includes: when the timeout identifier indicates that the entry timeout timer expires, if the CNP is not sent within a timing period of the entry timeout timer, deleting the flow table entry of the first data flow.

In an optional implementation, the sending M CNPs to the second device based on the N CE packets includes: after the first data flow is congested, sending the M CNPs to the second device based on the N CE packets.

In this application, only after the first data flow is congested, the server may actively create the auxiliary CNP and send the auxiliary CNP to the second device when the CNP is not sent to the second device. In this way, when the first queue does not enter the congested state, the rate reduction processing caused by an unnecessary CNP can be avoided.

In an optional implementation, before the sending M CNPs to the second device based on the N CE packets, the method further includes: determining a current status of the first data flow; and when the first data flow is not in the congested state, and a quantity of received CE packets in the first data flow is greater than a third threshold, determining that the first data flow enters the congested state; or when the first data flow is not in the congested state, and a quantity of sent CNPs is greater than a fourth threshold, determining that the first data flow enters the congested state; or when the first data flow is in the congested state and a non-CE packet in the first data flow is received, determining that the first data flow exits the congested state; or when the first data flow is in the congested state and no packet in the corresponding data flow is received within a specified time period, determining that the first data flow exits the congested state; or when the first data flow is in the congested state and no CNP is sent within a specified time period, determining that the first data flow exits the congested state.

According to a third aspect, this application provides a flow rate control apparatus. The apparatus includes:

a receiving module, configured to receive N explicit congestion notification packets CNPs from a first device, where the N CNPs correspond to a first data flow, and N is a natural number; and a sending module, configured to send M CNPs to a second device based on the N CNPs, where the M CNPs correspond to the first data flow, and M is an integer greater than N.

In an optional implementation, the CNP is used to indicate that the first data flow is congested.

In an optional implementation, the CNP includes a first destination address, a first source address, and a first destination queue pair identifier; and a packet in the first data flow includes a second destination address, a second source address, and a second destination queue pair identifier, where the first destination address is the same as the second source address, and the first source address is the same as the second destination address.

In an optional implementation, the sending module is specifically configured to send the M CNPs based on a specified period.

In an optional implementation, the apparatus further includes: a processing module, configured to: monitor, within a current period, whether the CNP from the first device is received. The sending module is specifically configured to: if the CNP from the first device is not received, create an auxiliary CNP, and send the auxiliary CNP to the second device.

In an optional implementation, the processing module is further configured to: from receiving the first CNP in the N CNPs, start timing each time one CNP is received. The sending module is further configured to: when timing duration exceeds a specified threshold, if a next CNP from the first device is not received, create an auxiliary CNP, and send the auxiliary CNP to the second device.

In an optional implementation, the processing module is further configured to: start timing each time the auxiliary CNP is sent to the second device. The sending module is further configured to: when timing duration exceeds the specified threshold, if a next CNP from the first device is not received, create another auxiliary CNP, and send the another auxiliary CNP to the second device.

In an optional implementation, that the CNP from the first device is not received means that a value of a CNP passing marker in a flow table entry of the first data flow is the first value.

In an optional implementation, the processing module is further configured to: monitor, within the current period, whether the CNP from the first device is received; and if the CNP from the first device is received, set the value of the CNP passing marker in the flow table entry of the first data flow to a second value, and set the value of the CNP passing marker to the first value when the current period ends.

In an optional implementation, the processing module is further configured to create the flow table entry of the first data flow based on a link establishment packet. The flow table entry of the first data flow includes the second destination address, the second source address, the second destination queue pair identifier, a source queue pair identifier of the first data flow, and the CNP passing marker.

In an optional implementation, the processing module is further configured to delete the flow table entry of the first data flow based on a link deletion packet.

In an optional implementation, the processing module is further configured to: when the flow table entry of the first data flow does not exist, if the CNP from the first device is received for the first time, create the flow table entry of the first data flow and start an entry timeout timer. The flow table entry of the first data flow includes the second destination address, the second source address, the source queue pair identifier of the first data flow, the CNP passing marker, and a timeout identifier of the flow table entry of the first data flow, where the timeout identifier is used to indicate whether the entry timeout timer expires.

In an optional implementation, the processing module is further configured to: when the timeout identifier indicates that the entry timeout timer expires, if the CNP from the first device is not received within a timing period of the entry timeout timer, delete the flow table entry of the first data flow.

In an optional implementation, the sending module is specifically configured to: after a first queue enters a congested state, send the M CNPs to the second device based on the N CNPs, where the first queue is a queue including the first data flow in a plurality of egress sending queues.

In an optional implementation, the apparatus further includes: a processing module, configured to determine a current status of the first queue; and when the first queue is not in the congested state and a depth of the first queue is greater than a first threshold, determine that the first queue enters the congested state; or when the first queue is in the congested state and a depth of the first queue is less than a second threshold, determine that the first queue exits the congested state, where the first threshold is greater than the second threshold.

According to a fourth aspect, this application provides a flow rate control apparatus. The apparatus includes:

a receiving module, configured to receive a first data flow from a second device, where the first data flow includes N congestion encountered CE packets, and N is a natural number; and a sending module, configured to send M explicit congestion notification packets CNPs to the second device based on the N CE packets, where the M CNPs correspond to the first data flow, and M is an integer greater than N.

In an optional implementation, the CNP is used to indicate that the first data flow is congested.

In an optional implementation, the CNP includes a first destination address, a first source address, and a first destination queue pair identifier; and a packet in the first data flow includes a second destination address, a second source address, and a second destination queue pair identifier, where the first destination address is the same as the second source address, and the first source address is the same as the second destination address.

In an optional implementation, the sending module is specifically configured to send the M CNPs based on a specified period.

In an optional implementation, the sending module is specifically configured to: monitor, within a current period, whether the CNP is sent; and if the CNP is not sent, create an auxiliary CNP, and send the auxiliary CNP to the second device.

In an optional implementation, that the CNP is not sent means that a value of a CNP sending marker in a flow table entry of the first data flow is a first value.

In an optional implementation, the apparatus further includes: a processing module, configured to: monitor, within the current period, whether the CNP is sent; and if the CNP is sent, set the value of the CNP sending marker in the flow table entry of the first data flow to a second value, and set the value of the CNP sending marker to the first value when the current period ends.

In an optional implementation, the processing module is further configured to create the flow table entry of the first data flow based on a link establishment packet. The flow table entry of the first data flow includes the second destination address, the second source address, the second destination queue pair identifier, a source queue pair identifier of the first data flow, and the CNP sending marker.

In an optional implementation, the processing module is further configured to delete the flow table entry of the first data flow based on a link deletion packet.

In an optional implementation, the processing module is further configured to: when the flow table entry of the first data flow does not exist, if the CNP is sent for the first time, create the flow table entry of the first data flow and start an entry timeout timer. The flow table entry of the first data flow includes the second destination address, the second source address, the source queue pair identifier of the first data flow, the CNP sending marker, and a timeout identifier of the flow table entry of the first data flow, where the timeout identifier is used to indicate whether the entry timeout timer expires.

In an optional implementation, the processing module is further configured to: when the timeout identifier indicates that the entry timeout timer expires, if the CNP is not sent within a timing period of the entry timeout timer, delete the flow table entry of the first data flow.

In an optional implementation, the sending module is specifically configured to: after the first data flow is congested, send the M CNPs to the second device based on the N CE packets.

In an optional implementation, the apparatus further includes: a processing module, configured to determine a current status of the first data flow; and when the first data flow is not in the congested state, and a quantity of received CE packets in the first data flow is greater than a third threshold, determine that the first data flow enters the congested state; or when the first data flow is not in the congested state, and a quantity of sent CNPs is greater than a fourth threshold, determine that the first data flow enters the congested state; or when the first data flow is in the congested state, and a non-CE packet in the first data flow is received, determine that the first data flow exits the congested state; or when the first data flow is in the congested state, and no packet in the corresponding data flow is received within a specified time period, determine that the first data flow exits the congested state; or when the first data flow is in the congested state, and no CNP is sent within a specified time period, determine that the first data flow exits the congested state.

According to a fifth aspect, this application provides a network device, including:
one or more processors; and
a memory, configured to store one or more programs, where
when the one or more programs are executed by the one or more processors, the one or more processors are enabled to implement the method in any one of the possible implementations of the first aspect.

According to a sixth aspect, this application provides a server, including:
one or more processors; and
a memory, configured to store one or more programs, where
when the one or more programs are executed by the one or more processors, the one or more processors are enabled to implement the method in any one of the possible implementations of the second aspect.

According to a seventh aspect, this application provides a computer-readable storage medium, including a computer program. When the computer program is executed on a computer, the computer is enabled to perform the method in any one of the first aspect and the second aspect.

According to an eighth aspect, this application provides a computer program, where when the computer program is executed by a computer, the computer is configured to perform the method in any one of the first aspect and the second aspect.

DESCRIPTION OF EMBODIMENTS

To make objectives, technical solutions, and advantages of this application clearer, the following clearly describes technical solutions in this application with reference to accompanying drawings in this application. It is clear that the described embodiments are merely some rather than all of the embodiments of this application. All other embodiments obtained by a person of ordinary skill in the art based on the embodiments of this application without creative efforts shall fall within the protection scope of this application.

In the embodiments, claims, and the accompanying drawings of the specification in this application, terms such as "first" and "second" are merely used for distinction and description, and should not be understood as an indication or implication of relative importance, or as an indication or implication of an order. In addition, terms "including" and "having" and any variants thereof are intended to cover non-exclusive inclusion, for example, include a series of steps or units. A method, system, product, or device is not necessarily limited to those steps or units that are expressly listed, but may include other steps or units that are not expressly listed or inherent to such a process, method, product, or device.

It should be understood that, in this application, "at least one" means one or more, and "a plurality of" means two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "/" usually represents an "or" relationship between the associated objects. "At least one of the following items (pieces)" or a similar expression thereof means any combination of these items, including a single item (piece) or any combination of a plurality of items (pieces). For example, at least one (piece) of a, b, or c may represent a, b, c, "a and b", "a and c", "b and c", or "a, b, and c", where a, b, and c may be singular or plural.

Figure 1:
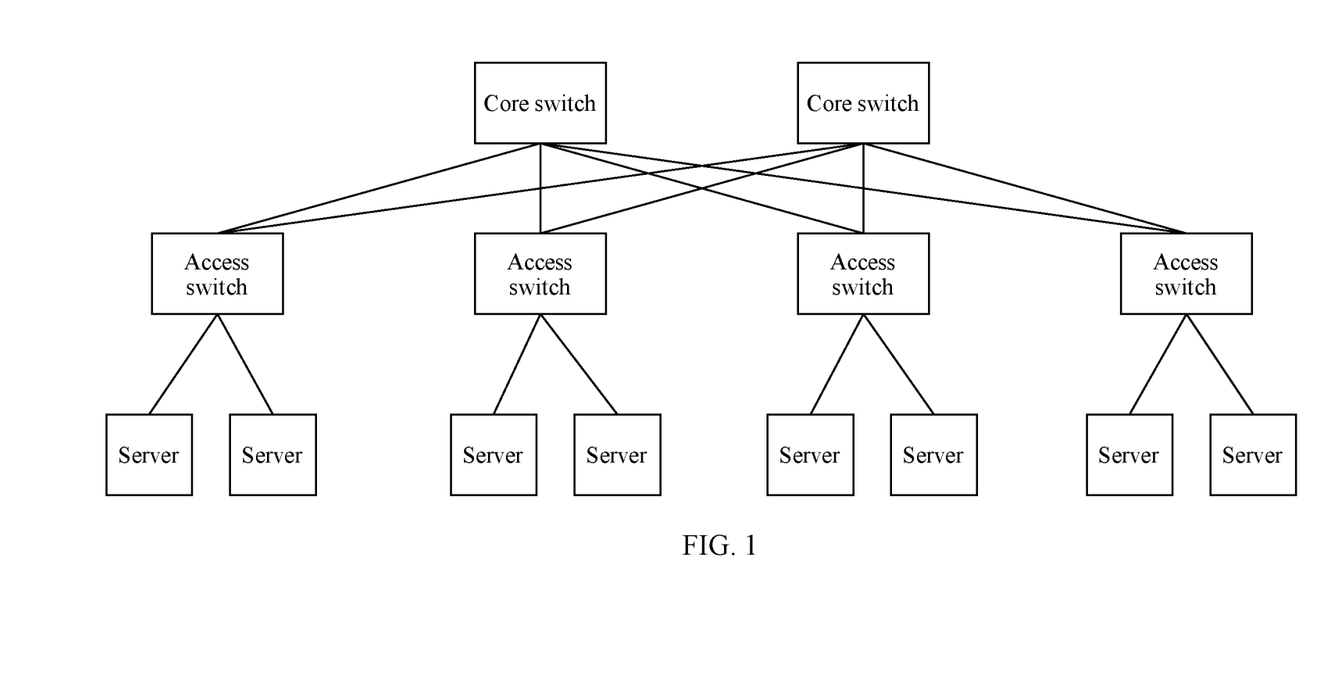
FIG. 1 is an example of a typical scenario to which a flow rate control method is applicable according to this application.

FIG. 1 is an example of a typical scenario to which a flow rate control method is applicable according to this application. As shown in FIG. 1, the scenario is a data center network, and the data center network may be applied to high performance computing, high performance distributed storage, big data, artificial intelligence, and the like. The data center network may be a CLOS network. The CLOS network includes core switches and access switches. A server accesses a network by using the access switch.

It should be noted that FIG. 1 shows an example of the scenario to which the flow rate control method in this application is applicable. This application is further applicable to an RDMA scenario. Therefore, the application scenario is not specifically limited in this application.

Figure 2:
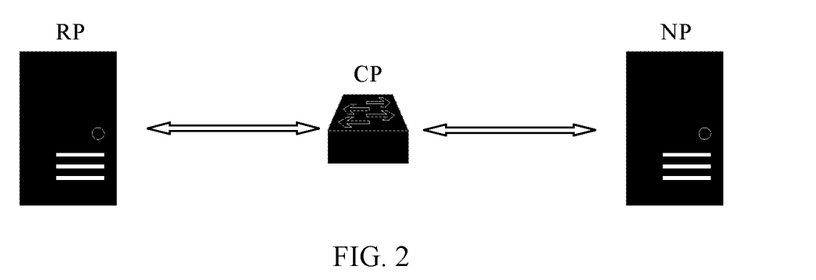
FIG. 2 is an example of a communication system for implementing an existing congestion control method.

FIG. 2 is an example of a communication system for implementing an existing congestion control method. As shown in FIG. 2, the communication system may include an RP, a CP, and an NP. The RP and the NP may be the servers in the scenario shown in FIG. 1, and the CP may be the core switch or the access switch in the scenario shown in FIG. 1. A congestion control process may include: On the CP, if a depth of an egress queue at an egress port of the CP exceeds a threshold, the CP determines that the egress queue enters a congested state; and the CP adds an ECN marker to a to-be-sent packet in the egress queue. The packet with the ECN marker is referred to as a congestion encountered (CE) packet. On the NP, when the CE packet arrives, the NP immediately sends one CNP to notify the RP that a data flow is congested; or the RP may send only one CNP after receiving a plurality of CE packets, to notify the RP that a data flow is congested. On the RP, when the RP receives one CNP, the RP reduces a sending rate and updates a rate reduction factor. In addition, if the RP does not receive a CNP within a continuous period of time, the RP increases the sending rate according to a specific algorithm. However, when a scale of flows is relatively large, for a congested flow, an interval at which the data flow obtains a corresponding CNP may be longer than an interval at which the RP performs rate increase. As a result, rate increase processing is performed on the congested flow, rate control convergence fails, and packet transmission efficiency is affected.

This application provides a flow rate control method, to resolve the foregoing technical problems.

Figure 3:
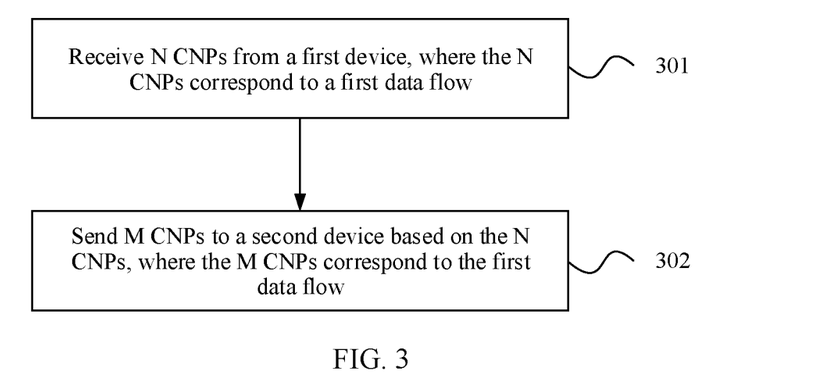
FIG. 3 is a flowchart of Embodiment 1 of a flow rate control method according to this application.

FIG. 3 is a flowchart of Embodiment 1 of a flow rate control method according to this application. As shown in FIG. 3, the method in this embodiment may be performed by a network device, and the network device may be the core switch or the access switch in the scenario shown in FIG. 1. The flow rate control method may include:

Step 301: Receive N CNPs from a first device, where the N CNPs correspond to a first data flow.

N is a natural number. Generally, the first device is a receive end of the first data flow, for example, the NP in FIG. 2; and a second device is a transmit end of the first data flow, for example, the RP in FIG. 2. It should be noted that, in this application, the first device may alternatively be the transmit end of the first data flow, for example, the RP in FIG. 2; and the second device may alternatively be the receive end of the first data flow, for example, the NP in FIG. 2. In addition, the first device may alternatively be another downstream network device of the network device; and the second device may alternatively be another upstream network device of the network device. The first device and the second device are not specifically limited in this application.

In this application, the CNP is used to indicate that the first data flow is congested. Based on the congestion control process described in FIG. 2, the network device may receive a plurality of CNPs from the first device, and need to forward the CNPs to the second device.

The CNP includes a first destination address, a first source address, and a first destination queue pair identifier; and a packet in the first data flow includes a second destination address, a second source address, and a second destination queue pair identifier. That the CNP corresponds to the first data flow means that the first destination address is the same as the second source address (the address is usually an address of the transmit end device of the first data flow, for example, an address of the RP); and the first source address is the same as the second destination address (the address is usually an address of the receive end device of the first data flow, for example, an address of the NP). In addition, that the CNP corresponds to the first data flow may further mean that the first destination queue pair identifier corresponds to the second destination queue pair identifier, in other words, the first destination queue pair and the second destination queue pair form a pair of queue pairs.

In an optional implementation, after the first queue enters a congested state, the network device sends M CNPs to the second device based on the N CNPs, where the first queue is a queue including the first data flow in a plurality of egress sending queues.

In other words, only after the first queue enters the congested state, the network device may actively create an auxiliary CNP, and send the auxiliary CNP to the second device when the CNP from the first device is not received. In this way, when the first queue does not enter the congested state, rate reduction processing caused by an unnecessary CNP can be avoided.

The plurality of egress queues may be created in the network device. Each to-be-sent data flow is allocated to each queue. The network device may sequentially select a data flow from each queue based on a priority of each queue and send the data flow. In this application, the first queue may be any egress queue of the network device, and the queue includes the first data flow. When the first queue is not in the congested state and a depth of the first queue is greater than a first threshold, the network device may determine that the first queue enters the congested state; or when the first queue is in the congested state and a depth of the first queue is less than a second threshold, the network device may determine that the first queue exits the congested state, where the first threshold is greater than the second threshold.

Step 302: Send the M CNPs to the second device based on the N CNPs, where the M CNPs correspond to the first data flow.

M is an integer greater than N. The network device may send the M CNPs to the second device based on a specified period. The specified period in this application may be set with reference to a rate increase period in which the transmit end device of the first data flow (for example, the RP) performs rate increase processing on a sending rate of the data flow. For example, a rate increase determining period is 300 μs by default, and the period may be set to be within 80% to 95% of the rate increase determining period, namely, 240 μs to 285 μs.

The following describes a process in which the network device performs flow rate control by using a current period as an example.

The network device monitors, within the current period, whether the CNP from the first device is received. If no CNP from the first device is received, the network device creates the auxiliary CNP, and sends the auxiliary CNP to the second device.

In this application, if the network device receives the CNP from the first device, the network device immediately forwards the CNP to the second device. If the network device does not receive the CNP from the first device within the current period, the network device actively creates an auxiliary CNP when the current period ends, and then sends the auxiliary CNP to the second device. It can be ensured that the transmit end device of the first data flow (for example, the RP) can receive one CNP corresponding to the first data flow at a specified interval, to perform the rate reduction processing on the sending rate of the first data flow based on the CNP, thereby avoiding a problem that rate increase processing is still performed on the first data flow when the first data flow is congested.

That the CNP from the first device is not received means that a value of a CNP passing marker in a flow table entry of the first data flow maintained by the network device is a first value.

In other words, in this application, the network device may send the CNP to the second device based on a specific marker (for example, the CNP passing marker) in the pre-created flow table entry of the first data flow. The CNP passing marker in the flow table entry of the first data flow is used to indicate whether the network device receives the CNP from the first device within the current period. For example, if the value of the CNP passing marker is the first value (for example, 0), it indicates that the network device does not receive the CNP from the first device within the current period. If the value of the CNP passing marker is a second value (for example, 1), it indicates that the network device receives the CNP from the first device within the current period. The network device reads the flow table entry of the first data flow. If the value of the CNP passing marker in the flow table entry is the second value, it indicates that the network device has received the CNP from the first device, and has forwarded the CNP from the first device to the second device. If the value of the CNP passing marker is the first value, it indicates that the network device does not receive the CNP from the first device. The network device actively creates the auxiliary CNP, and then sends the auxiliary CNP to the second device. It can be ensured that the transmit end device of the first data flow (for example, the RP) can receive the CNP corresponding to the first data flow at the specified interval, to perform the rate reduction processing on the sending rate of the first data flow based on the CNP, thereby avoiding the problem that rate increase processing is still performed on the first data flow when the first data flow is congested.

In an optional implementation, the process in which the network device performs flow rate control may alternatively be that regardless of whether the CNP from the first device is received within the current period, the network device sends one CNP to the second device when the current period ends. If the network device receives the CNP from the first device, the network device forwards the CNP to the second device when the current period ends. If the network device does not receive the CNP from the first device, the network device creates the auxiliary CNP when the current period ends, and sends the auxiliary CNP to the second device. It can also be ensured that the transmit end device of the first data flow (for example, the RP) can receive the CNP corresponding to the first data flow at the specified interval, to perform the rate reduction processing on the first data flow based on the CNP, thereby avoiding the problem that the rate increase processing is still performed on the first data flow when the first data flow is congested.

In this application, the network device receives the N CNPs from the first device, and then sends the M CNPs to the second device, where M is greater than N. It can be ensured that the transmit end device of the first data flow can receive the CNP corresponding to the first data flow at the specified interval, to perform the rate reduction processing on the sending rate of the first data flow based on the CNP, thereby avoiding the problem that the rate increase processing is still performed on the first data flow when the first data flow is congested.

In an optional implementation, the network device may create the flow table entry of the first data flow by using the following two methods.

In a first method, the transmit end device and the receive end device of the first data flow send link establishment packets to each other, where the link establishment packet sent by the transmit end device includes the address and a queue identifier of the transmit end device, and the link establishment packet sent by the receive end device includes the address and a queue identifier of the receive end device. A queue of the transmit end device and a queue of the receive end device form a queue pair, and a data flow and a corresponding CNP are sent and received on a same pair of queue pairs. For example, after a data flow in a queue A of the transmit end device is sent to the receive end device, a CNP for the data flow belongs to a queue B of the receive end device, where the queue A and the queue B are a pair of queue pairs.

The network device creates the flow table entry of the first data flow based on the link establishment packet. The flow table entry of the first data flow includes the second destination address (for example, an IP address of the receive end device of the first data flow), the second source address (for example, an IP address of the transmit end device of the first data flow), and the second destination queue pair identifier (for example, the queue identifier in the receive end device of the first data flow) that are in the first data flow, a source queue pair identifier of the first data flow (for example, the queue identifier in the transmit end device of the first data flow), and the CNP passing marker. The network device may further delete the flow table entry of the first data flow based on a link deletion packet (which is sent by the transmit end device or the receive end device of the first data flow).

The network device may monitor, within the current period, whether the CNP from the first device is received. If the CNP from the first device is received, the network device sets the value of the CNP passing marker in the flow table entry of the first data flow to the second value, and sets the value of the CNP passing marker to the first value when the current period ends. The network device divides a time axis by period. Within the current period, if the network device receives the CNP from the first device, the network device sets the value of the CNP passing marker in the flow table entry of the first data flow to the second value. When the current period ends, the network device sets the value of the CNP passing marker to the first value, to start a new monitoring operation within a next period.

In a second method, when the flow table entry of the first data flow does not exist, if the network device receives the CNP from the first device for the first time, the network device creates the flow table entry of the first data flow based on the CNP, and starts an entry timeout timer. In the method, the network device creates the flow table entry of the first data flow based on the CNP received from the first device for the first time, and determines a deletion moment of the flow table entry of the first data flow by using the entry timeout timer. The flow table entry of the first data flow includes the second destination address (namely, the first source address in the CNP, for example, the IP address of the receive end device of the first data flow), and the second source address (namely, the first destination address in the CNP, for example, the IP address of the transmit end device of the first data flow) that are in the first data flow, the source queue pair identifier of the first data flow (namely, the first destination queue pair identifier in the CNP, for example, the queue identifier in the transmit end device of the first data flow), the CNP passing marker, and a timeout identifier of the flow table entry of the first data flow, where the timeout identifier is used to indicate whether the entry timeout timer expires.

The network device monitors, within the current period, whether the CNP from the first device is received. If the CNP from the first device is received, the network device sets the value of the CNP passing marker in the flow table entry of the first data flow to the second value, and sets the value of the CNP passing marker to the first value when the current period ends. The network device divides the time axis by period. Within the current period, if the network device receives the CNP from the first device, the network device sets the value of the CNP passing marker in the flow table entry of the first data flow to the second value. When the current period ends, the network device sets the value of the CNP passing marker to the first value, to start the new monitoring operation within the next period. When the timeout identifier indicates that the entry timeout timer expires, if the CNP from the first device is not received within a timing period of the entry timeout timer, the network device deletes the flow table entry of the first data flow.

Figure 4:
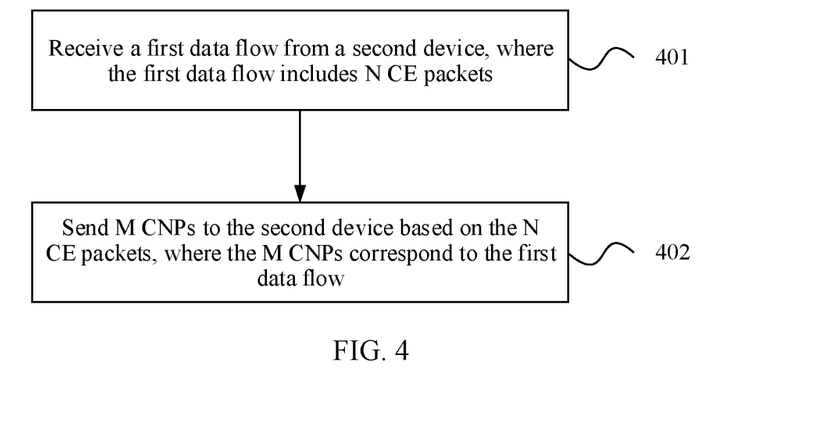
FIG. 4 is a flowchart of Embodiment 2 of a flow rate control method according to this application.

FIG. 4 is a flowchart of Embodiment 2 of a flow rate control method according to this application. As shown in FIG. 4, the method in this embodiment may be performed by the server in the scenario shown in FIG. 1, and the server mainly implements a function of the NP in FIG. 2. The flow rate control method may include:

Step 401: Receive a first data flow from a second device, where the first data flow includes N CE packets.

N is a natural number. Generally, a first device is a receive end of the first data flow, for example, the NP in FIG. 2; and the second device is a transmit end of the first data flow, for example, the RP in FIG. 2. In addition, the second device may alternatively be another upstream network device of the server. The first device and the second device are not specifically limited in this application.

In this application, the CE packet is a packet generated after a network device (for example, the core switch or the access switch in the scenario shown in FIG. 1) adds an ECN marker to a packet of the first data flow, and is used to indicate that the first data flow is congested.

Step 402: Send M CNPs to the second device based on the N CE packets, where the M CNPs correspond to the first data flow.

M is an integer greater than N. The server may send the M CNPs to the second device based on a specified period. The specified period in this application may be set with reference to a rate increase period in which the transmit end device of the first data flow (for example, the RP) performs rate increase processing on a sending rate of the data flow. For example, a rate increase determining period is 300 μs by default, and the period may be set to be within 80% to 95% of the rate increase determining period, namely, 240 μs to 285 μs.

The CNP includes a first destination address, a first source address, and a first destination queue pair identifier; and a packet in the first data flow includes a second destination address, a second source address, and a second destination queue pair identifier. That the CNP corresponds to the first data flow means that the first destination address is the same as the second source address (the address is usually an address of the transmit end device of the first data flow, for example, an address of the RP); and the first source address is the same as the second destination address (the address is usually an address of the receive end device of the first data flow, for example, an address of the NP). In addition, that the CNP corresponds to the first data flow may further mean that the first destination queue pair identifier corresponds to the second destination queue pair identifier, in other words, the first destination queue pair and the second destination queue pair form a pair of queue pairs.

The following describes a process in which the server performs flow rate control by using a current period as an example.

The server monitors, within the current period, whether the CNP is sent. If no CNP is sent, the server creates an auxiliary CNP, and sends the auxiliary CNP to the second device.

Based on the congestion control process described in FIG. 2, the server may receive a plurality of CE packets in the first data flow from the network device. In this case, the server may separately send one CNP to the second device for each CE packet; or the server may send only one CNP to the second device for the plurality of CE packets.

However, if the CNP is not sent within the current period, the server actively creates one auxiliary CNP when the current period ends, and then sends the auxiliary CNP to the second device. It can be ensured that the transmit end device of the first data flow (for example, the RP) can receive one CNP corresponding to the first data flow at a specified interval, to perform rate reduction processing on the sending rate of the first data flow based on the CNP, thereby avoiding a problem that the rate increase processing is still performed on the first data flow when the first data flow is congested.

That the CNP is not sent means that a value of a CNP sending marker in a flow table entry of the first data flow maintained by the server is a first value. In other words, in this application, the server may send the CNP to the second device based on a specific marker (for example, the CNP sending marker) in the pre-created flow table entry of the first data flow. The CNP sending marker of the flow table entry of the first data flow is used to indicate whether the server sends the CNP within the current period. For example, if the value of CNP sending marker is the first value (for example, 0), it indicates that the server does not send the CNP to the second device within the current period. If the value of CNP sending marker is a second value (for example, 1), it indicates that the server sends the CNP to the second device within the current period. The server reads the flow table entry of the first data flow. If the value of CNP sending marker in the flow table entry is the second value, it indicates that the server has sent the CNP to the second device. If the value of CNP sending marker in the flow table entry is the first value, it indicates that the server does not send the CNP to the second device, and the server actively creates one auxiliary CNP, and then sends the auxiliary CNP to the second device. It can be ensured that the transmit end device of the first data flow (for example, the RP) can receive the CNP corresponding to the first data flow at the specified interval, to perform the rate reduction processing on the sending rate of the first data flow based on the CNP, thereby avoiding the problem that the rate increase processing is still performed on the first data flow when the first data flow is congested.

In an optional implementation, the process in which the server performs flow rate control may alternatively be that regardless of whether the CNP is sent within the current period, the server sends one CNP to the second device when the current period ends. If the server needs to send the CNP, the server sends one CNP to the second device when the current period ends. If the server does not send the CNP, the server creates the auxiliary CNP, and sends the auxiliary CNP to the second device when the current period ends. It can also be ensured that the transmit end device of the first data flow (for example, the RP) can receive the CNP corresponding to the first data flow at the specified interval, to perform the rate reduction processing on the sending rate of the first data flow based on the CNP, thereby avoiding the problem that the rate increase processing is still performed on the first data flow when the first data flow is congested.

In an optional implementation, after the first data flow is congested, the server sends the M CNPs to the second device based on the N CE packets.

In other words, only after the first data flow is congested, the server may actively create the auxiliary CNP, and send the auxiliary CNP to the second device when the CNP is not sent. In this way, when the first data flow is not congested, the rate reduction processing caused by an unnecessary CNP can be avoided.

When the first data flow is not in a congested state, and a quantity of received CE packets in the first data flow is greater than a third threshold, the server may determine that the first data flow enters the congested state; or when the first data flow is not in a congested state, and a quantity of sent CNPs is greater than a fourth threshold, the server may determine that the first data flow enters the congested state; or when the first data flow is in a congested state, and a non-CE packet in the first data flow is received, the server may determine that the first data flow exits the congested state; or when the first data flow is in a congested state, and no packet in the corresponding data flow is received within a specified time period, the server may determine that the first data flow exits the congested state; or when the first data flow is in a congested state, and no CNP is sent within a specified time period, the server may determine that the first data flow exits the congested state.

In this application, the server receives the first data flow from the second device, where the first data flow includes the N CE packets; and then sends the M CNPs to the second device, where M is greater than N. It can be ensured that the second device can receive the CNP corresponding to the first data flow at the specified interval, so that the rate reduction processing is performed on the first data flow based on the CNP, thereby avoiding the problem that the rate increase processing is still performed on the first data flow when the first data flow is congested.

In an optional implementation, the server may create the flow table entry of the first data flow by using the following two methods.

In a first method, the transmit end device and the receive end device of the first data flow send link establishment packets to each other, where the link establishment packet sent by the transmit end device includes the address and a queue identifier of the transmit end device, and the link establishment packet sent by the receive end device includes the address and a queue identifier of the receive end device. A queue of the transmit end device and a queue of the receive end device form a queue pair, and a data flow and a corresponding CNP are sent and received on a same pair of queue pairs. For example, after a data flow in a queue A of the transmit end device is sent to the receive end device, a CNP for the data flow belongs to a queue B of the receive end device, where the queue A and the queue B are a pair of queue pairs.

The server creates the flow table entry of the first data flow based on the link establishment packet. The flow table entry of the first data flow includes the second destination address (for example, an IP address of the receive end device of the first data flow), the second source address (for example, an IP address of the transmit end device of the first data flow), and the second destination queue pair identifier (for example, the queue identifier in the receive end device of the first data flow) that are in the first data flow, a source queue pair identifier of the first data flow (for example, the queue identifier in the transmit end device of the first data flow), and the CNP sending marker. The server may further delete the flow table entry of the first data flow based on a link deletion packet (which is sent by the transmit end device or the receive end device of the first data flow).

The server may monitor, within the current period, whether the CNP is sent. If the CNP is sent, the server sets the value of the CNP sending marker in the flow table entry of the first data flow to the second value, and sets the value of the CNP sending marker to the first value when the current period ends. The server divides a time axis by period. Within the current period, if the server sends the CNP, the server sets the value of the CNP sending marker in the flow table entry of the first data flow to the second value. When the current period ends, the server sets the value of the CNP sending marker to the first value, to start a new monitoring operation within a next period.

In a second method, when the flow table entry of the first data flow does not exist, if the server sends the CNP for the first time, the server creates the flow table entry of the first data flow based on the CNP, and starts an entry timeout timer. In the method, the server creates the flow table entry of the first data flow based on the CNP sent for the first time, and determines a deletion moment of the flow table entry of the first data flow by using the entry timeout timer. The flow table entry of the first data flow includes the second destination address (namely, the first source address in the CNP, for example, the IP address of the receive end device of the first data flow), and the second source address (namely, the first destination address in the CNP, for example, the IP address of the transmit end device of the first data flow) that are in the first data flow, the source queue pair identifier of the first data flow (namely, the first destination queue pair identifier in the CNP, for example, the queue identifier in the transmit end device of the first data flow), the CNP sending marker, and a timeout identifier of the flow table entry of the first data flow, where the timeout identifier is used to indicate whether the entry timeout timer expires.

The server monitors, within the current period, whether the CNP is sent. If the CNP is sent, the server sets the value of the CNP sending marker in the flow table entry of the first data flow to the second value, and sets the value of the CNP sending marker to the first value when the current period ends. The server divides a time axis by period. Within the current period, if the server sends the CNP, the server sets the value of the CNP sending marker in the flow table entry of the first data flow to the second value. When the current period ends, the server sets the value of the CNP sending marker to the first value, to start a new monitoring operation within a next period. When the timeout identifier indicates that the entry timeout timer expires, if the CNP is not sent within a timing period of the entry timeout timer, the server deletes the flow table entry of the first data flow.

Figure 5:
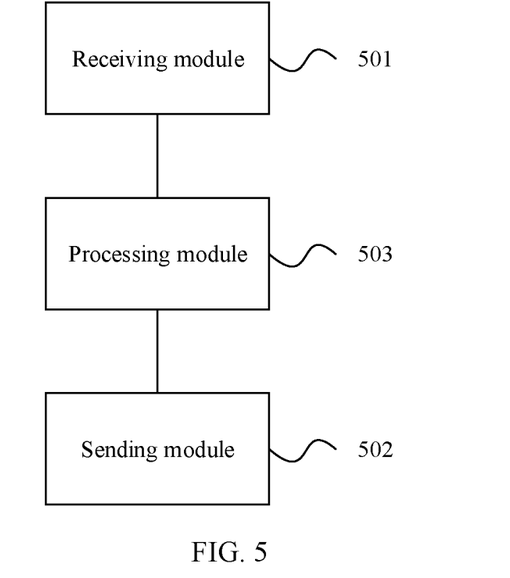
FIG. 5 is a schematic diagram of a structure of an embodiment of a flow rate control apparatus according to this application.

FIG. 5 is a schematic diagram of a structure of an embodiment of a flow rate control apparatus according to this application. As shown in FIG. 5, the apparatus in this embodiment is applied to the network device in Embodiment 1 of the foregoing method, or may be applied to the server in Embodiment 2 of the foregoing method. The apparatus includes a receiving module 501, a sending module 502, and a processing module 503.

When the flow rate control apparatus is applied to the network device in Embodiment 1 of the foregoing method, the receiving module 501 is configured to receive N explicit congestion notification packets CNPs from a first device, where the N CNPs correspond to a first data flow, and N is a natural number. The sending module 502 is configured to send M CNPs to a second device based on the N CNPs, where the M CNPs correspond to the first data flow, and M is an integer greater than N.

In an optional implementation, the CNP is used to indicate that the first data flow is congested.

In an optional implementation, the CNP includes a first destination address, a first source address, and a first destination queue pair identifier; and a packet in the first data flow includes a second destination address, a second source address, and a second destination queue pair identifier, where the first destination address is the same as the second source address, and the first source address is the same as the second destination address.

In an optional implementation, the sending module 502 is specifically configured to send the M CNPs based on a specified period.

In an optional implementation, the processing module 503 is configured to monitor, within a current period, whether the CNP from the first device is received. The sending module 502 is specifically configured to: if the CNP from the first device is not received, create an auxiliary CNP, and send the auxiliary CNP to the second device.

In an optional implementation, the processing module 503 is further configured to: from receiving the first CNP in the N CNPs, start timing each time one CNP is received. The sending module 502 is further configured to: when timing duration exceeds a specified threshold, if a next CNP from the first device is not received, create an auxiliary CNP, and send the auxiliary CNP to the second device.

In an optional implementation, the processing module 503 is further configured to start timing each time the auxiliary CNP is sent to the second device. The sending module 502 is further configured to: when timing duration exceeds the specified threshold, if a next CNP from the first device is not received, create another auxiliary CNP, and send the another auxiliary CNP to the second device.

In an optional implementation, that the CNP from the first device is not received means that a value of a CNP passing marker in a flow table entry of the first data flow is the first value.

In an optional implementation, the processing module 503 is further configured to: monitor, within the current period, whether the CNP from the first device is received; and if the CNP from the first device is received, set the value of the CNP passing marker in the flow table entry of the first data flow to a second value, and set the value of the CNP passing marker to the first value when the current period ends.

In an optional implementation, the processing module 503 is further configured to create the flow table entry of the first data flow based on a link establishment packet. The flow table entry of the first data flow includes the second destination address, the second source address, the second destination queue pair identifier, a source queue pair identifier of the first data flow, and the CNP passing marker.

In an optional implementation, the processing module 503 is further configured to delete the flow table entry of the first data flow based on a link deletion packet.

In an optional implementation, the processing module 503 is further configured to: when the flow table entry of the first data flow does not exist, if the CNP from the first device is received for the first time, create the flow table entry of the first data flow and start an entry timeout timer. The flow table entry of the first data flow includes the second destination address, the second source address, the source queue pair identifier of the first data flow, the CNP passing marker, and a timeout identifier of the flow table entry of the first data flow, where the timeout identifier is used to indicate whether the entry timeout timer expires.

In an optional implementation, the processing module 503 is further configured to: when the timeout identifier indicates that the entry timeout timer expires, if the CNP from the first device is not received within a timing period of the entry timeout timer, delete the flow table entry of the first data flow.

In an optional implementation, the sending module 502 is specifically configured to: after a first queue enters a congested state, send the M CNPs to the second device based on the N CNPs, where the first queue is a queue including the first data flow in a plurality of egress sending queues.

In an optional implementation, the processing module 503 is configured to: determine a current status of the first queue; and when the first queue is not in the congested state and a depth of the first queue is greater than a first threshold, determine that the first queue enters the congested state; or when the first queue is in the congested state and a depth of the first queue is less than a second threshold, determine that the first queue exits the congested state, where the first threshold is greater than the second threshold.

The apparatus may be configured to execute the technical solution of the method embodiment shown in FIG. 3. Implementation principles and technical effects of the apparatus are similar, and details are not described herein again.

When the flow rate control apparatus is applied to the server in Embodiment 2 of the foregoing method, the receiving module 501 is configured to receive a first data flow from a second device, where the first data flow includes N congestion encountered CE packets, and N is a natural number. The sending module 502 is configured to send M explicit congestion notification packets CNPs to the second device based on the N CE packets, where the M CNPs correspond to the first data flow, and M is an integer greater than N.

In an optional implementation, the CNP is used to indicate that the first data flow is congested.

In an optional implementation, the CNP includes a first destination address, a first source address, and a first destination queue pair identifier; and a packet in the first data flow includes a second destination address, a second source address, and a second destination queue pair identifier, where the first destination address is the same as the second source address, and the first source address is the same as the second destination address.

In an optional implementation, the sending module 502 is specifically configured to send the M CNPs based on a specified period.

In an optional implementation, the sending module 502 is specifically configured to: monitor, within a current period, whether the CNP is sent; if the CNP is not sent, create an auxiliary CNP, and send the auxiliary CNP to the second device.

In an optional implementation, that the CNP is not sent means that a value of a CNP sending marker in a flow table entry of the first data flow is a first value.

In an optional implementation, the processing module 503 is configured to: monitor, within the current period, whether the CNP is sent; if the CNP is sent, set the value of the CNP sending marker in the flow table entry of the first data flow to a second value, and set the value of the CNP sending marker to the first value when the current period ends.

In an optional implementation, the processing module 503 is further configured to: create the flow table entry of the first data flow based on a link establishment packet. The flow table entry of the first data flow includes the second destination address, the second source address, the second destination queue pair identifier, a source queue pair identifier of the first data flow, and the CNP sending marker.

In an optional implementation, the processing module 503 is further configured to delete the flow table entry of the first data flow based on a link deletion packet.

In an optional implementation, the processing module 503 is further configured to: when the flow table entry of the first data flow does not exist, if the CNP is sent for the first time, create the flow table entry of the first data flow and start an entry timeout timer. The flow table entry of the first data flow includes the second destination address, the second source address, the source queue pair identifier of the first data flow, the CNP sending marker, and a timeout identifier of the flow table entry of the first data flow, where the timeout identifier is used to indicate whether the entry timeout timer expires.

In an optional implementation, the processing module 503 is further configured to: when the timeout identifier indicates that the entry timeout timer expires; if the CNP is not sent within a timing period of the entry timeout timer, delete the flow table entry of the first data flow.

In an optional implementation, the sending module 502 is specifically configured to: after the first data flow is congested, send the M CNPs to the second device based on the N CE packets.

In an optional implementation, the processing module 503 is configured to: determine a current status of the first data flow; and when the first data flow is not in a congested state, and a quantity of received CE packets in the first data flow is greater than a third threshold, determine that the first data flow enters the congested state; or when the first data flow is not in a congested state, and a quantity of sent CNPs is greater than a fourth threshold, determine that the first data flow enters the congested state; or when the first data flow is in a congested state and a non-CE packet in the first data flow is received, determine that the first data flow exits the congested state; or when the first data flow is in a congested state and no packet in the corresponding data flow is received within a specified time period, determine that the first data flow exits the congested state; or when the first data flow is in a congested state and no CNP is sent within a specified time period, determine that the first data flow exits the congested state.

The apparatus may be configured to execute the technical solution of the method embodiment shown in FIG. 4. Implementation principles and technical effects of the apparatus are similar, and details are not described herein again.

Figure 6:
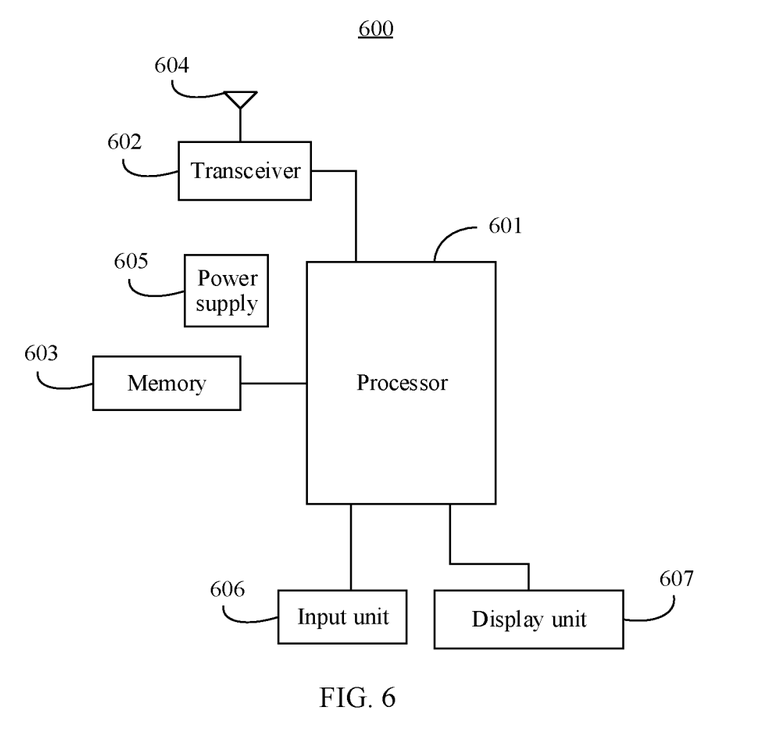
FIG. 6 is a schematic diagram of a structure of a device 600 according to this application.

FIG. 6 is a schematic diagram of a structure of a device 600 according to this application. As shown in FIG. 6, the device 600 may be the network device in Embodiment 1, or may be the server in Embodiment 2. The device 600 includes a processor 601 and a transceiver 602.

Optionally, the device 600 further includes a memory 603. The processor 601, the transceiver 602, and the memory 603 may communicate with each other through an internal connection path, to transfer a control signal and/or a data signal.

The memory 603 is configured to store a computer program. The processor 601 is configured to execute the computer program stored in the memory 603, to implement functions of the flow rate control apparatus in the foregoing apparatus embodiment.

Optionally, the memory 603 may alternatively be integrated into the processor 601, or may be independent of the processor 601.

Optionally, the device 600 may further include an antenna 604, configured to transmit a signal output by the transceiver 602. Alternatively, the transceiver 602 receives a signal by using the antenna.

Optionally, the device 600 may further include a power supply 605, configured to supply power to various components or circuits in the network device.

In addition, to improve functions of the network device, the device 600 may further include an input unit 606 or a display unit 607 (which may also be considered as an output unit).

This application further provides a computer-readable storage medium. The computer-readable storage medium stores a computer program. When the computer program is executed by a computer, the computer is enabled to perform steps and/or processing performed by a network device or a server in any one of the foregoing method embodiments.

This application further provides a computer program product. The computer program product includes computer program code. When the computer program code is run on a computer, the computer is enabled to perform steps and/or processing performed by a network device or a server in any one of the foregoing method embodiments.

In an implementation process, the steps in the foregoing method embodiments may be completed by using a hardware integrated logic circuit in a processor or instructions in a form of software. The processor may be a general-purpose processor, a digital signal processor (digital signal processor, DSP), an application-specific integrated circuit (application-specific integrated circuit, ASIC), or a field programmable gate array (field programmable gate array, FPGA) or another programmable logic device, a discrete gate or a transistor logic device, or a discrete hardware component. The general-purpose processor may be a microprocessor, or the processor may be any conventional processor or the like. The steps of the methods disclosed in the embodiments of this application may be directly executed and completed by using a hardware encoding processor, or may be executed and completed by using a combination of hardware and software modules in the encoding processor. A software module may be located in a mature storage medium in the art, for example, a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor.

The memory in the foregoing embodiments may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that, the memory in the system and method described in this specification includes but is not limited to these memories and any memory of another proper type.

A person of ordinary skill in the art may be aware that, in combination with the examples described in the embodiments disclosed in this specification, units and algorithm steps can be implemented by electronic hardware or a combination of computer software and electronic hardware. Whether the functions are performed by the hardware or the software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or may not be performed. In addition, the displayed or discussed mutual coupling or direct coupling or communication connection may be implemented through some interfaces. Indirect coupling or communication connection between the apparatuses or units may be implemented in electrical, mechanical, or other forms.

Units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, functional units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (a personal computer, a server, a network device, or the like) to perform all or some of the steps of the methods described in the embodiments of this application. The foregoing storage medium includes any medium, for example, a USB flash drive, a removable hard disk, a read-only memory (ROM), a random access memory (RAM), a magnetic disk, or an optical disc, that can store program code.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A flow rate control method for a network device, comprising:
   receiving N explicit congestion notification packets (CNPs) from a first device, wherein the N CNPs correspond to a first data flow, and N is a natural number; and
   sending M CNPs to a second device within a first period based on the N CNPs, wherein the M CNPs correspond to the first data flow, and M is an integer greater than N;
   wherein the first period is determined according to a second period in which the second device increases the sending rate of the first data flow.

2. The method according to claim 1, wherein at least one CNP is used to indicate that the first data flow is congested.

3. The method according to claim 1, wherein at least one CNP comprises a first destination address, a first source address, and a first destination queue pair identifier; and a packet in the first data flow comprises a second destination address, a second source address, and a second destination queue pair identifier, wherein the first destination address is the same as the second source address, and the first source address is the same as the second destination address.

4. The method according to claim 3, wherein the sending M CNPs to a second device based on the N CNPs comprises:
   monitoring, within a current period, whether one of the CNPs from the first device is received; and
   if one of the CNPs from the first device is not received within the current period, creating an auxiliary CNP, and sending the auxiliary CNP to the second device, wherein the auxiliary CNP is created by the network device when no CNP from the first device is received within the current period.

5. The method according to claim 4, wherein that the CNP from the first device is not received means that a value of a CNP passing marker in a flow table entry of the first data flow is a first value.

6. The method according to claim 5, further comprising:
   monitoring, within the current period, whether the CNP from the first device is received; and
   if the CNP from the first device is received, setting the value of the CNP passing marker in the flow table entry of the first data flow to a second value, and setting the value of the CNP passing marker to the first value when the current period ends.

7. The method according to claim 3, wherein the sending M CNPs to a second device based on the N CNPs comprises:
   upon receiving the first CNP in the N CNPs, resetting and starting a timer each time one CNP is received; and
   when a duration of the timer exceeds a specified threshold, if a next CNP from the first device has not been received, creating an auxiliary CNP, and sending the auxiliary CNP to the second device, wherein the auxiliary CNP is created by the network device when no CNP from the first device is received within the current period.

8. The method according to claim 7, further comprising:
resetting and starting the timer each time the auxiliary CNP is sent to the second device; and when the duration of the timer exceeds the specified threshold again, if a next CNP from the first device is not received, creating another auxiliary CNP, and sending the another auxiliary CNP to the second device.

9. The method according to claim 1, wherein the sending M CNPs to a second device based on the N CNPs comprises:
after a first queue enters a congested state, sending the M CNPs to the second device based on the N CNPs, wherein the first queue is a queue comprising the first data flow in a plurality of egress sending queues.

10. A flow rate control method for a first device, comprising:
receiving a first data flow from a second device, wherein the first data flow comprises N congestion encountered (CE) packets, and N is a natural number; and
sending M explicit congestion notification packets (CNPs) to the second device based on the N CE packets, wherein the M CNPs correspond to the first data flow, and M is an integer greater than N;
wherein the first period is determined according to a second period in which the second device increases the sending rate of the first data flow.

11. The method according to claim 10, wherein at least one CNP is used to indicate that the first data flow is congested.

12. The method according to claim 10, wherein at least one CNP comprises a first destination address, a first source address, and a first destination queue pair identifier; and a packet in the first data flow comprises a second destination address, a second source address, and a second destination queue pair identifier, wherein the first destination address is the same as the second source address, and the first source address is the same as the second destination address.

13. The method according to claim 12, wherein the sending M CNPs to the second device based on the N CE packets comprises:
monitoring, within a current period, whether the CNP is sent; and
if the CNP is not sent, creating an auxiliary CNP, and sending the auxiliary CNP to the second device, wherein the auxiliary CNP is created by the first device when no CNP is sent within the current period.

14. A flow rate control apparatus, comprising:
one or more processors; and
a non-transitory computer-readable memory storing a program to be executed by the one or more processors, the program including instructions that, when executed by the one or more processors, cause the apparatus to:
receive N explicit congestion notification packets (CNPs) from a first device, wherein the N CNPs correspond to a first data flow, and N is a natural number; and
send M CNPs to a second device according to a first period based on the N CNPs, wherein the M CNPs correspond to the first data flow, and M is an integer greater than N;
wherein the first period is determined according to a second period in which the second device increases the sending rate of the first data flow.

15. The apparatus according to claim 14, wherein at least one CNP is used to indicate that the first data flow is congested.

16. The apparatus according to claim 14, wherein at least one CNP comprises a first destination address, a first source address, and a first destination queue pair identifier; and a packet in the first data flow comprises a second destination address, a second source address, and a second destination queue pair identifier, wherein the first destination address is the same as the second source address, and the first source address is the same as the second destination address.

17. The apparatus according to claim 14, wherein the sending M CNPs to a second device based on the N CNPs comprises:
monitoring, within a current period, whether one of the CNPs from the first device is received; and
if one of the CNPs from the first device is not received within the current period, creating an auxiliary CNP, and sending the auxiliary CNP to the second device, wherein the auxiliary CNP is created by the apparatus when no CNP from the first device is received within the current period.

* * * * *